United States Patent
Setlak

(10) Patent No.: US 9,436,863 B2
(45) Date of Patent: Sep. 6, 2016

(54) RECONSTRUCTING A BIOMETRIC IMAGE

(71) Applicant: Apple Inc., Cupertino, CA (US)

(72) Inventor: Dale Setlak, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/056,785

(22) Filed: Feb. 29, 2016

(65) Prior Publication Data

US 2016/0180140 A1 Jun. 23, 2016

Related U.S. Application Data

(63) Continuation-in-part of application No. 14/022,044, filed on Sep. 9, 2013, now abandoned.

(51) Int. Cl.
*G06K 9/00* (2006.01)

(52) U.S. Cl.
CPC ............ *G06K 9/00013* (2013.01); *G06K 9/00* (2013.01)

(58) Field of Classification Search
CPC ........ G06F 21/32; G06F 21/83; G06F 3/041; G06F 3/044; G06F 3/0488; G06F 2203/04101; G06F 3/04845; G06F 3/04886; G06K 9/00013; G06K 9/00375; G06K 9/6272; G06K 9/00597; G06K 9/00885; G06K 9/036; G07C 9/00158; H03K 17/9622; H04N 3/155; H04N 5/232; H04N 5/3594; H04N 5/35527; H04N 5/3559; H04N 5/23258; H04N 1/442; H04N 1/4433; A61B 5/0059; A61B 5/7267; A63B 2225/15; G06Q 20/40145; H04L 63/0861
USPC ............... 343/156, 158, 173, 174, 178, 184; 382/115, 116, 124, 125, 126
See application file for complete search history.

(56) References Cited

U.S. PATENT DOCUMENTS

| 5,844,961 | A | * | 12/1998 | McEvoy | A61B 6/4494 348/E5.086 |
|---|---|---|---|---|---|
| 5,872,834 | A | * | 2/1999 | Teitelbaum | H04M 11/00 379/110.01 |
| 5,995,630 | A | * | 11/1999 | Borza | G06F 21/32 340/5.26 |
| 6,041,410 | A | * | 3/2000 | Hsu | G06K 9/00013 380/285 |
| 6,181,807 | B1 | | 1/2001 | Setlak et al. | |
| 6,323,846 | B1 | | 11/2001 | Westerman et al. | |
| 6,518,560 | B1 | * | 2/2003 | Yeh | G06K 9/0002 250/214 AG |
| 6,556,935 | B2 | | 4/2003 | Morimura et al. | |
| 6,570,557 | B1 | | 5/2003 | Westerman et al. | |

(Continued)

OTHER PUBLICATIONS

U.S. Appl. No. 13/831,578, filed Mar. 15, 2013, Marciniak et al.

(Continued)

*Primary Examiner* — Vu Le
*Assistant Examiner* — Aklilu Woldermariam
(74) *Attorney, Agent, or Firm* — Brownstein Hyatt Farber Schreck, LLP

(57) ABSTRACT

A biometric sensing device is operatively connected to a processing channel. The processing channel can include one or more variable gain amplifiers and/or one or more variable offset circuits. The signal levels associated with a section of a biometric image can be reconstructed using a digitized section of the biometric image and a particular gain and/or a particular offset value used in the processing channel to process the digitized section of the biometric image. The reconstructed sections of the biometric image can be combined to form a reconstructed biometric image. Additional processing operations can be performed on the reconstructed biometric image.

14 Claims, 5 Drawing Sheets

(56) References Cited

U.S. PATENT DOCUMENTS

| | | | |
|---|---|---|---|
| 6,628,810 B1* | 9/2003 | Harkin | A61B 5/117 382/116 |
| 6,677,932 B1 | 1/2004 | Westerman | |
| 6,719,200 B1* | 4/2004 | Wiebe | G06F 21/32 235/382 |
| 6,766,040 B1* | 7/2004 | Catalano | G06K 9/00067 340/5.53 |
| 6,888,536 B2 | 5/2005 | Westerman et al. | |
| 7,039,224 B2* | 5/2006 | Hamid | G06K 9/00046 382/124 |
| 7,212,658 B2 | 5/2007 | Du et al. | |
| 7,274,807 B2 | 9/2007 | Hillhouse et al. | |
| 7,327,859 B1 | 2/2008 | Chau | |
| 7,385,381 B1* | 6/2008 | Mainguet | G01D 5/2405 324/71.1 |
| 7,474,773 B2 | 1/2009 | Chau | |
| 7,590,269 B2 | 9/2009 | Creasey et al. | |
| 7,599,530 B2 | 10/2009 | Boshra | |
| 7,616,786 B2 | 11/2009 | Setlak | |
| 7,616,787 B2 | 11/2009 | Boshra | |
| 7,688,314 B2 | 3/2010 | Abdallah et al. | |
| 7,770,019 B2 | 8/2010 | Ferren et al. | |
| 7,894,685 B2 | 2/2011 | Zhai et al. | |
| 7,953,258 B2 | 5/2011 | Dean et al. | |
| 7,970,185 B2 | 6/2011 | Kim et al. | |
| 7,990,269 B2 | 8/2011 | Bork et al. | |
| 8,073,204 B2* | 12/2011 | Kramer | A61B 5/1172 250/208.1 |
| 8,131,026 B2 | 3/2012 | Benkley et al. | |
| 8,150,108 B2 | 4/2012 | Miller | |
| 8,190,907 B2 | 5/2012 | Tu | |
| 8,411,913 B2 | 4/2013 | Zhang et al. | |
| 8,520,913 B2* | 8/2013 | Dean | G06K 9/0002 382/124 |
| 8,570,293 B2 | 10/2013 | Deng et al. | |
| 8,625,861 B2 | 1/2014 | Aggarwal et al. | |
| 8,682,295 B2 | 3/2014 | Esaki | |
| 8,903,141 B2 | 12/2014 | Heilpern | |
| 8,943,580 B2 | 1/2015 | Fadell et al. | |
| 8,995,729 B2 | 3/2015 | Marques et al. | |
| 9,035,895 B2 | 5/2015 | Bussat et al. | |
| 9,092,652 B2 | 7/2015 | Marciniak et al. | |
| 9,218,544 B2 | 12/2015 | Myers | |
| 9,342,725 B2 | 5/2016 | Vieta et al. | |
| 2002/0080256 A1* | 6/2002 | Bates | G06K 9/00597 348/335 |
| 2002/0150282 A1* | 10/2002 | Kinsella | G06K 9/00013 382/124 |
| 2002/0167394 A1* | 11/2002 | Couillard | G06K 19/0716 340/5.53 |
| 2003/0002718 A1* | 1/2003 | Hamid | G06K 9/0002 382/124 |
| 2003/0002719 A1* | 1/2003 | Hamid | G06K 9/00026 382/124 |
| 2003/0007670 A1* | 1/2003 | Hamid | G06K 9/00006 382/124 |
| 2003/0129965 A1* | 7/2003 | Siegel | G06F 21/10 455/411 |
| 2003/0172027 A1* | 9/2003 | Scott | G06F 21/10 705/39 |
| 2004/0005087 A1* | 1/2004 | Hillhouse | G06F 21/32 382/125 |
| 2006/0104483 A1* | 5/2006 | Harel | G07C 9/00158 382/115 |
| 2006/0188132 A1 | 8/2006 | Shigeta et al. | |
| 2007/0081698 A1* | 4/2007 | Hamid | G06K 9/00046 382/124 |
| 2007/0179734 A1* | 8/2007 | Chmiel | A61B 5/00 702/127 |
| 2008/0074307 A1* | 3/2008 | Boric-Lubecke | A61B 5/0205 342/28 |
| 2008/0317306 A1* | 12/2008 | Hamilton | G06K 9/00026 382/128 |
| 2010/0026451 A1* | 2/2010 | Erhart | G06K 9/00013 340/5.53 |
| 2011/0013814 A1* | 1/2011 | Ivanov | G06K 9/00013 382/124 |
| 2011/0084711 A1 | 4/2011 | Chang et al. | |
| 2012/0075452 A1* | 3/2012 | Ferren | G02B 13/0065 348/78 |
| 2013/0101186 A1 | 4/2013 | Walch et al. | |
| 2015/0071507 A1 | 3/2015 | Setlak | |

OTHER PUBLICATIONS

U.S. Appl. No. 13/842,052, filed Mar. 15, 2013, Vieta et al.
U.S. Appl. No. 13/802,609, filed Mar. 13, 2013, Bussat et al.
U.S. Appl. No. 13/757,581, filed Feb. 1, 2013, Myers.
U.S. Appl. No. 14/022,044, filed Sep. 9, 2013, Setlak.
Represent [online]. Dictionary.com 2015 [retrieved Jan. 30, 2015]. Retrieved from the Internet: <URL: http://dictionary.reference.com/browse/represent?s=t>, p. 1.

* cited by examiner

RECONSTRUCTING A BIOMETRIC IMAGE

CROSS-REFERENCE TO RELATED APPLICATION

This application is a continuation-in-part of U.S. patent application Ser. No. 14/022,044, filed Sep. 9, 2013, entitled "Reconstructing a Biometric Image," the contents of which are incorporated herein by reference as if fully disclosed herein.

TECHNICAL FIELD

The present invention relates to electronic devices, and more particularly to a biometric sensing device included in, or connected to an electronic device.

BACKGROUND

Biometric sensing devices are increasingly used in conjunction with computer or network security applications, financial applications, surveillance applications, and system access control applications. For example, a common approach to fingerprint identification involves capturing a sample fingerprint image and storing the image and/or the unique characteristics of the fingerprint image. The characteristics of the sample fingerprint may be compared to a reference fingerprint image and/or the unique characteristics of the reference fingerprint image to identify or verify the identity of a person.

Typically, the biometric sensing device is connected to an analog processing channel that includes an analog-to-digital converter (ADC). The resolution of an ADC can be defined as the number of discrete digital values the ADC can produce over the range of analog input signals. For example, an ADC with a resolution of 8 bits can convert an analog input signal into one of 256 digital values. Typically, the biometric image is processed further after being output from the analog processing channel. In some embodiments, the resolution of the ADC can limit the quality or effectiveness of subsequent processing operations because information can be lost or restricted when the analog biometric signals are converted into a relatively small number of discrete digital values.

SUMMARY

In one aspect, a biometric image can be divided logically into image blocks, with each image block including pieces of a biometric image that were obtained from respective sensing elements in a biometric sensing device. Each image block can be processed individually by a processing channel operatively connected to the biometric sensing device. A particular gain of at least one variable amplifier and/or a particular offset value at least one variable offset circuit in the processing channel can be transmitted to a processing device along with the respective image block that was processed by the processing channel. The processing device can reconstruct the signal levels (e.g., voltage levels) on the respective sensing elements associated with the image block based on the particular gain and/or offset values. Each reconstructed image block can be combined to form a reconstructed biometric image. Additional processing operations such as deblurring and/or feature extraction can be performed on the reconstructed biometric image.

In another aspect, a processing channel can be operatively connected to a biometric sensing device that includes sensing elements. The processing channel can include at least one variable gain amplifier and/or at least one variable offset circuit operatively connected to an analog-to-digital converter. A processing device can be operatively connected to an output of the analog-to-digital converter. The processing device can receive one or more image blocks of the biometric image along with a particular gain of at least one variable amplifier in the processing channel and/or a particular offset value of at least one variable offset circuit in the processing channel and reconstruct the voltage levels of respective sensing elements associated with the image block(s) based on one or more particular gains and/or one or more particular offset values.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

DETAILED DESCRIPTION

Figure 1:
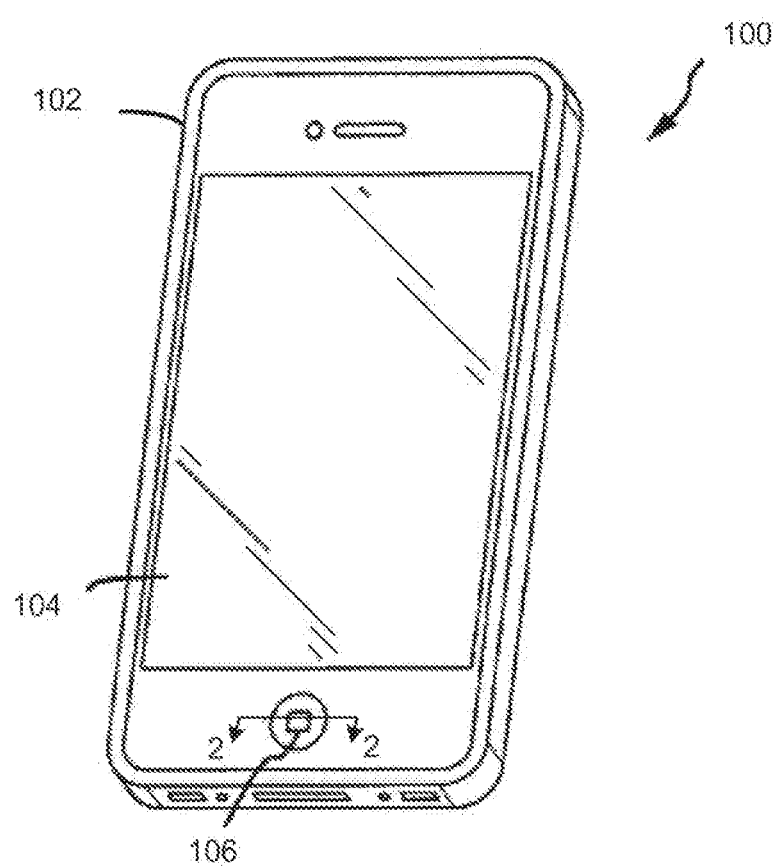
FIG. 1 is a perspective view of an example electronic device that can include a biometric sensing device.

Embodiments described herein can include a biometric sensing device operatively connected to a processing channel. The processing channel can include one or more variable gain amplifiers and/or one or more variable offset circuits. The voltage levels of respective sensing elements that are associated with a section of a biometric image can be reconstructed using a digitized section of the biometric image and a particular gain and/or a particular offset value used in the processing channel to process the digitized section of the biometric image. The reconstructed sections of the biometric image can be combined to form a reconstructed biometric image. Additional processing operations such as deblurring and/or feature extraction can be performed on the reconstructed biometric image.

In some embodiments, a variable gain or variable offset value can be set to a default preset value. The variable gain or offset values set to default values may not be transmitted to a processing device along with the section of the biometric image. The processing device can use the default values when values for respective gain and/or offset values are not received by the processing device. Similarly, one or more amplifiers in the processing channel may be fixed gain amplifiers, and/or one or more offset circuits can produced fixed offset values. The fixed gain and/or fixed offset values may or may not be transmitted to the processing device with the section of the biometric image.

Embodiments are described herein in conjunction with a fingerprint sensing device. Other embodiments, however, are not limited to a fingerprint sensing device. Any suitable type of biometric sensing device can be used to detect or acquire biometric data in other embodiments. For example, a person's fingerprint, eye, DNA, vein patterns, typing speed or patterns, gait, voice, face, and heart or brain signals are examples of a physical characteristic or a behavioral trait that can be detected or imaged by a biometric sensing device. A biometric sensing device can employ capacitance, ultrasonic, optical, resistive, thermal, or other sensing technologies to detect or image a biometric attribute. The term "biometric attribute" is meant to encompass a physical or behavioral trait that can be detected by a biometric sensing device.

Directional terminology, such as "top", "bottom", "front", "back", "leading", "trailing", etc., is used with reference to the orientation of the Figure(s) being described. Because components of embodiments described herein can be positioned in a number of different orientations, the directional terminology is used for purposes of illustration only and is in no way limiting. When used in conjunction with layers of a display or device, the directional terminology is intended to be construed broadly, and therefore should not be interpreted to preclude the presence of one or more intervening layers or other intervening features or elements. Thus, a given layer that is described as being formed, positioned, disposed on or over another layer, or that is described as being formed, positioned, disposed below or under another layer may be separated from the latter layer by one or more additional layers or elements.

Referring now to FIG. 1, there is shown a perspective view of one example of an electronic device that can include a biometric sensing device. In the illustrated embodiment, the electronic device 100 is implemented as a smart telephone. Other embodiments can implement the electronic device differently, such as, for example, as a laptop or desktop computer, a tablet computing device, a display, an input device, and other types of electronic devices that include, or are connected to a biometric sensing device.

The electronic device 100 includes an enclosure 102 at least partially surrounding a display 104 and one or more buttons 106 or input devices. The enclosure 102 can form an outer surface or partial outer surface and protective case for the internal components of the electronic device 100, and may at least partially surround the display 104. The enclosure 102 can be formed of one or more components operably connected together, such as a front piece and a back piece. Alternatively, the enclosure 102 can be formed of a single piece operably connected to the display 104.

The display 104 can be implemented with any suitable technology, including, but not limited to, a multi-touch sensing touchscreen that uses liquid crystal display (LCD) technology, light emitting diode (LED) technology, organic light-emitting display (OLED) technology, organic electroluminescence (OEL) technology, or another type of display technology. The button 106 can take the form of a home button, which may be a mechanical button, a soft button (e.g., a button that does not physically move but still accepts inputs), an icon or image on a display, and so on. Further, in some embodiments, the button 106 can be integrated as part of a cover glass of the electronic device.

Embodiments of an electronic device can include a biometric sensing device in the display 104, the home button 106, the enclosure 102, and/or as a separate electronic device that is connected to another electronic device. As one example, a fingerprint sensing device can be included in the button 106. The fingerprint sensing device can be implemented with any suitable sensing technology, including, but not limited to, capacitive, resistive, ultrasound, piezo-electric, and thermal sensing technology. Embodiments described herein include a capacitive fingerprint sensing device. The fingerprint sensing device can capture images one or more fingers or a portion of one or more fingers in some embodiments. As used herein, the term "image" or "fingerprint image" includes an image and other types of data that can be captured by a fingerprint sensing device. By way of example only, a fingerprint sensing device can produce a data structure that defines the features in a fingerprint.

Additionally, as discussed earlier, other embodiments can include any suitable type of biometric sensing device. The terms "image" and "biometric image" are meant to encompass an image and other types of data that can be captured by a biometric sensing device.

Figure 2:
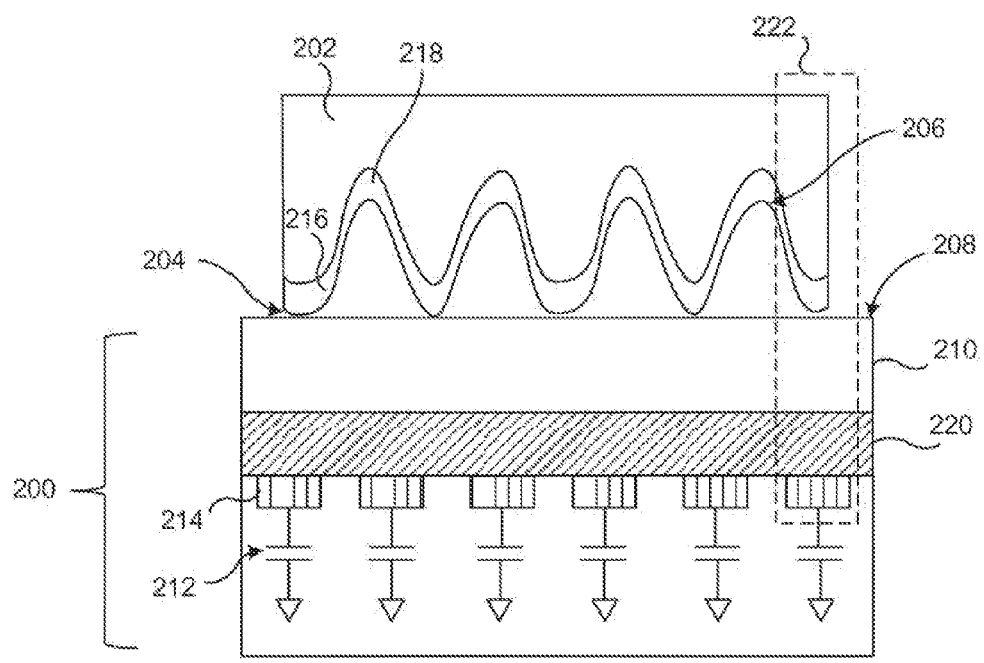
FIG. 2 illustrates an enlarged and simplified cross-section view of a portion of a fingerprint sensing device taken along line 2-2 in FIG. 1.

FIG. 2 illustrates an enlarged and simplified cross-section view of a portion of a fingerprint sensing device taken along line 2-2 in FIG. 1. The capacitive fingerprint sensing device 200 can capture an image of at least a portion of the finger 202. In the illustrated embodiment, the first layer 210 is included in a stack of layers. By way of example only, first layer 210 can be a dielectric layer such as an exterior surface of a button or other input device (e.g., home button 106 in FIG. 1), an exterior surface of a trackpad, and/or a cover glass of a display (e.g., display 104 in FIG. 1). Disposed under the first layer 210 is a dielectric layer 220. By way of example only, the dielectric layer 220 can be a color layer that can be used to reduce the visibility of the electrodes and other circuitry of the capacitive sensing device.

A fingerprint is generally formed from ridges 204 and valleys 206 arranged in a unique pattern. When the finger 202 touches an input region 208 of a first layer 210, the capacitance values (represented by capacitors 212) between the finger 202 and one or more electrodes 214 changes, and the variations in the measured capacitance values can be used to capture the fingerprint image. In the illustrated embodiment, a capacitive sensing element 222 is effectively formed by each electrode 214 in combination with a respectively overlying portion of the finger surface.

The skin on the finger 202 includes a dead skin layer 216 disposed over a live skin layer 218. The capacitive fingerprint sensing device typically images the dead skin layer 216 to obtain an image of the fingerprint. However, if a portion of the dead skin layer 216 is damaged or missing, the capacitive fingerprint sensing device can obtain an image of the fingerprint by imaging the live skin layer 218 by itself, or by imaging both the remaining dead skin layer 216 and the exposed live skin layer 218.

Figure 3:
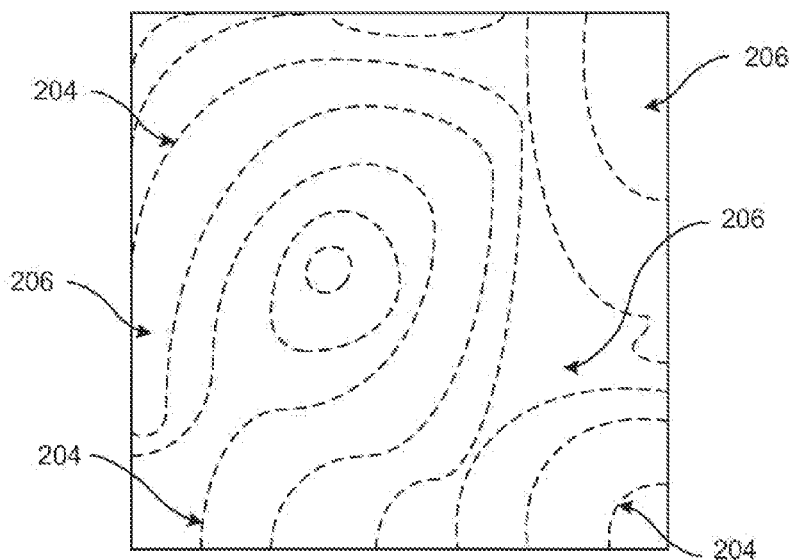
FIG. 3 depicts a portion of an example fingerprint image that may be captured by the fingerprint sensing device shown in FIG. 2.

Referring now to FIG. 3, there is shown a portion of an example fingerprint image. In FIG. 3, the ridges 204 are represented with dashed lines. The valleys 206 are located in the areas between the ridges 204. Typically, the capacitance measured between a ridge 204 and an electrode 214 varies from the capacitance measured between a valley 206 and an electrode 214. The measured capacitance between a ridge and an electrode can be greater than the measured capacitance between a valley and an electrode because the ridge is closer to the electrode. The differences in the measured capacitances can be used to distinguish between ridges and valleys to produce a fingerprint image.

Figure 4:
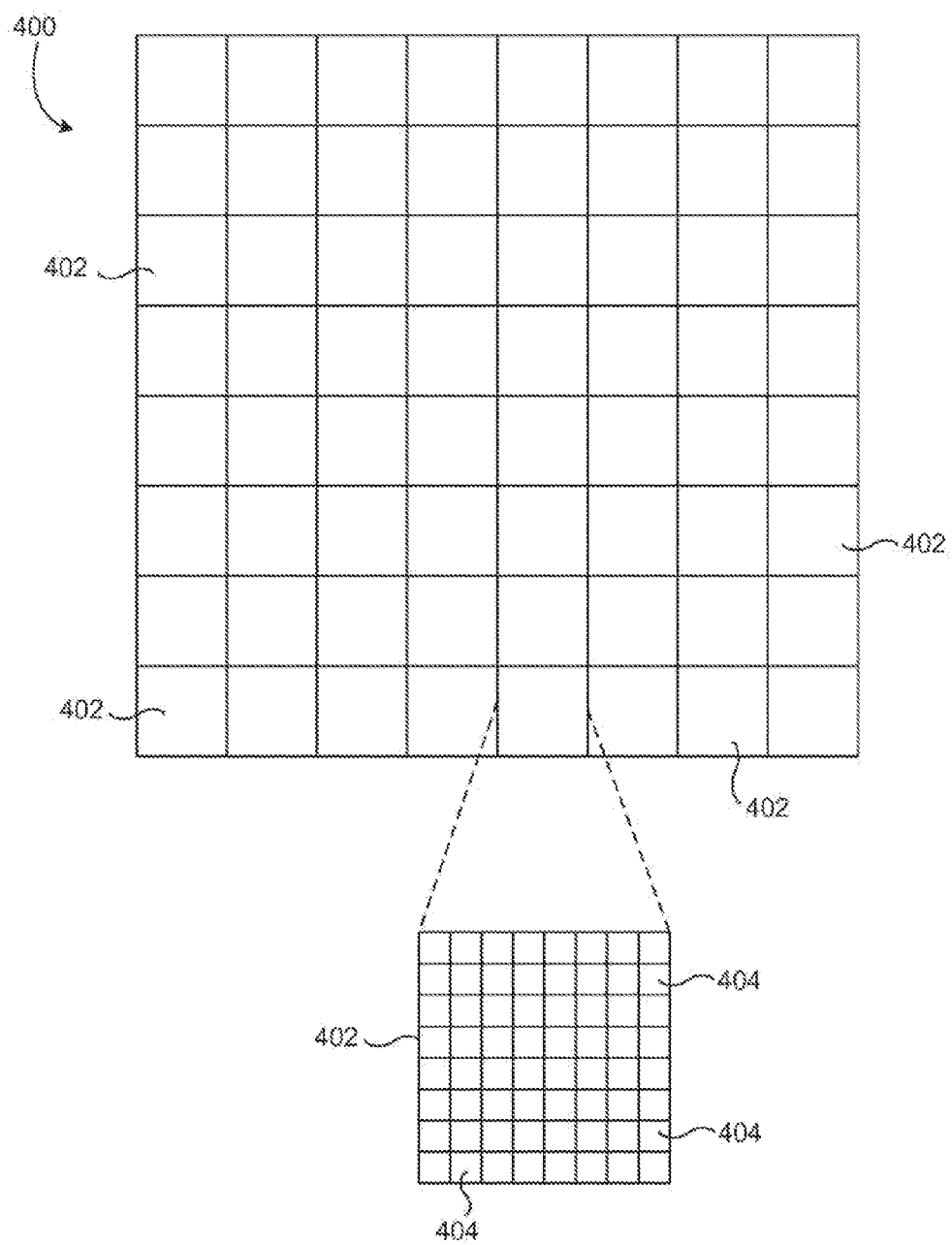
FIG. 4 illustrates a conceptual drawing of a fingerprint image logically divided into image blocks.

In some embodiments, an entire fingerprint image can be processed at one time, while other embodiments can divide a fingerprint image logically into blocks, and one or more blocks are then processed at a time. FIG. 4 illustrates a conceptual drawing of a fingerprint image logically divided into image blocks. A fingerprint image 400 can include image blocks 402, each of which represents a section of the fingerprint image. Each image block 402 can include pieces of the fingerprint image 404 that have been captured by respective capacitive sensing elements (e.g., capacitive sensing elements 222 in FIG. 2). By way of example only, the fingerprint image 400 can include eighty-eight by eighty-eight image blocks, and each image block 402 can include eight-by-eight fingerprint image pieces. Thus, in one embodiment, a fingerprint image can include eleven image blocks, with each block representing a non-overlapping portion of the fingerprint image.

Figure 5:
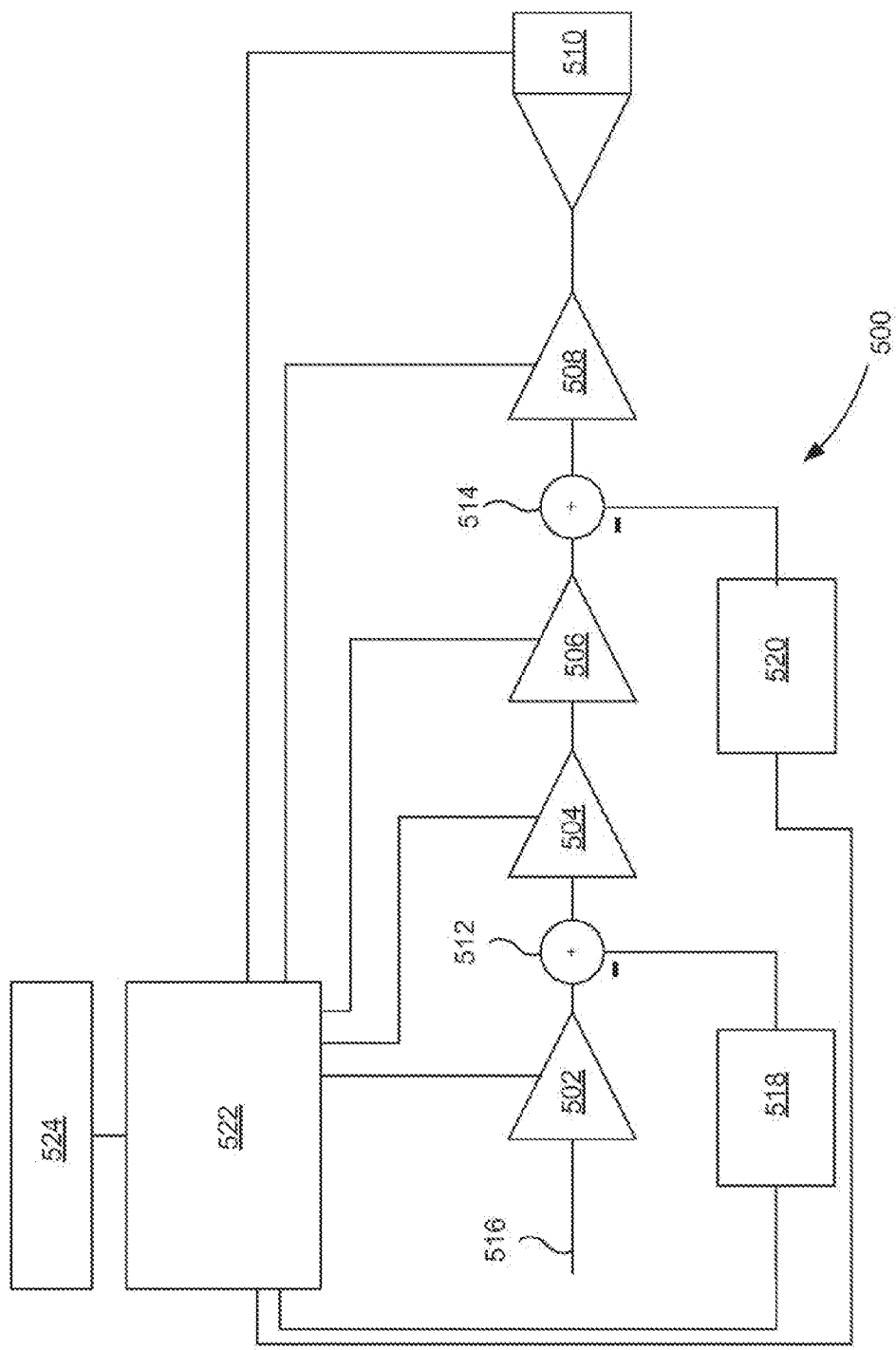
FIG. 5 depicts a capacitive sensing element connected to a processing channel.

In some embodiments, each image block 402 is processed individually when producing a fingerprint image. FIG. 5 illustrates one example of a simplified portion of a processing channel suitable for use with a capacitive fingerprint sensing device. Other embodiments can construct a processing channel differently, with fewer, additional, or different components. By way of example only, fewer amplifiers or only one offset circuit can be used.

The example processing channel 500 includes four amplifiers 502, 504, 506, 508 connected in series. An analog-to-digital converter (ADC) 510 is connected to the output of the fourth amplifier 508. A first summing circuit 512 is connected to an output of the first amplifier 502 and an input of the second amplifier 504. A second summing circuit 514 is connected to an output of the third amplifier 506 and an input of the fourth amplifier 508.

In the illustrated embodiment, an analog fingerprint signal received from each capacitive sensing element in an image block 402 is input into the first amplifier 502 on signal line 516. The first summing circuit 512 combines the signal output from the first amplifier 502 with a first offset signal produced by a first offset circuit 518. The analog signal output from the first summing circuit 512 is then input into the second amplifier 504. The signal output from the second amplifier is input into the third amplifier 506. The second summing circuit 514 combines the analog signal output from the third amplifier 506 with a second offset signal produced by a second offset circuit 520. The signal output from the second summing circuit 514 is input into the fourth amplifier 508. The signal output from the fourth amplifier 508 is then input into the ADC 510.

Any suitable type of amplifier can be used for each amplifier 502, 504, 506, 508. By way of example only, the first amplifier 502 can be a variable gain differential amplifier, the second amplifier 504 a variable gain AC amplifier, the third amplifier 506 a variable gain correlated double sampling (CDS) amplifier, and the fourth amplifier 508 a programmable gain amplifier.

Any suitable type of offset circuit can be used in the processing channel 500. By way of example only, the first and second offset circuits can be integrating digital-to-analog converters.

As will be described in more detail later, an operating parameter of at least one amplifier and/or at least one offset circuit is transmitted to a processing device 522 along with the image block processed by the processing channel 500. The operating parameter can be a gain of an amplifier or an offset value of an offset signal produced by an offset circuit. The processing device 522 can reconstruct the signal levels (e.g., voltage levels) on respective capacitive sensing elements associated with the pieces of fingerprint image in the image block using the operating parameter of at least one amplifier and/or at least one offset circuit. Each reconstructed image block can be combined to form a reconstructed fingerprint image. Additional processing operations such as deblurring and/or feature extraction can be performed on the reconstructed fingerprint image.

The processing device 522 can be adapted to adjust the gain of one or more amplifiers in the processing channel 500, to adjust the offset signal produced by one or more offset circuits, and/or to adjust the reference voltage of the ADC 510. The processing device 522 can be implemented with one or more processors, such as, for example, a microprocessor, an application-specific integrated circuit (ASIC), or a field programmable gate array (FPGA), either individually or in various combinations. The processing device 522 can be implemented on the same chip or integrated circuit as the processing channel 500 or the processing device 522 can be separated from the processing channel 500. For example, the processing device 522 can be a processor of the electronic device.

In some embodiments, the processing device 522 is a secure processor that is generally used to manipulate secure data. For example, the secure processor can decrypt an encrypted fingerprint image and match the decrypted fingerprint image with a reference fingerprint image. The secure processor 522 may have access to a key or other security parameter usable to decrypt data received from the fingerprint sensing device. For example, the secure processor and the fingerprint sensing device may share a factory provisioned key, enabling the secure processor to decrypt data received from the fingerprint sensing device. A separate application processor (not shown) that can be included in the fingerprint sensing device and/or in an electronic device that includes or is connected to the fingerprint sensing device may not have access to the key or other security parameter, and may be unable to decrypt data received from the fingerprint sensing device. In this manner, the application processor may be prevented from ever accessing decrypted fingerprint image(s) from the fingerprint sensing device, which may improve the security of the fingerprint image(s), for example, making a decrypted fingerprint image inaccessible or less accessible to other programs which may be running on the application processor.

A storage device 524 can be used to store the settings for the gains, offset signals, and/or reference voltage of the ADC that correspond to respective image blocks. The storage device 524 can store one or more reference fingerprint images. The storage device can be used to store one or more image blocks or a fingerprint image that is used to calibrate or test the processing channel. The storage device can store each image block and/or each reconstructed image block of the fingerprint image. The storage device 524 can be implemented with one or more suitable types of memory, such as, for example, dynamic random access memory, flash memory, and EEPROM, either individually or in various combinations. The storage device 524 can be implemented on the same chip or integrated circuit as the processing channel 500, or the storage device 524 can be separated from the processing channel 500.

Figure 6:
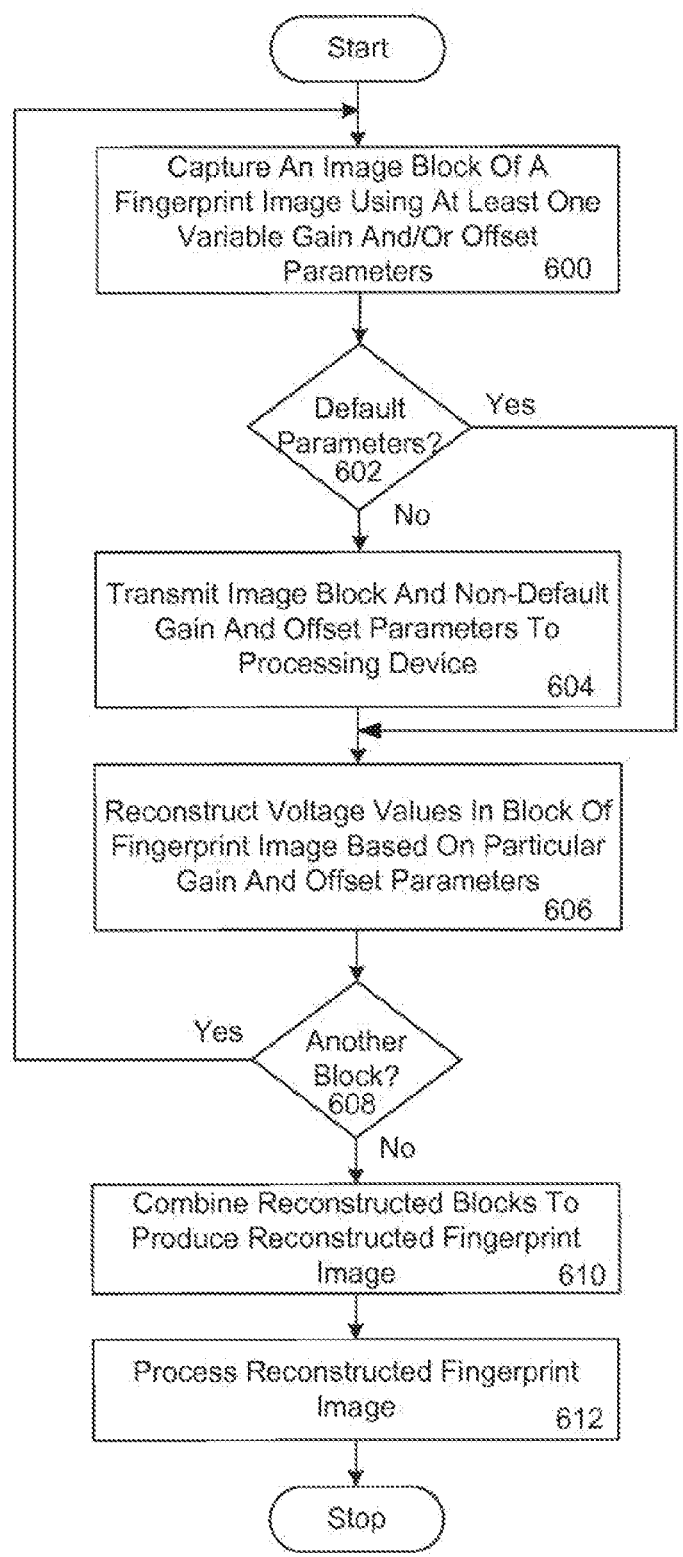
FIG. 6 is a flowchart of a method for operating a fingerprint sensing device.

Referring now to FIG. 6, there is shown a flowchart of a method for operating a fingerprint sensing device. Initially, an image block of a fingerprint image is captured using at least one variable operating parameter of a processing channel (block 600). The at least one variable operating parameter can be a gain of at least one variable amplifier in the processing channel and/or an offset value of at least one variable offset circuit in the processing channel. The image block (e.g., image block 402 in FIG. 4) of the fingerprint image can have any given size and/or dimension in the fingerprint image. In some embodiments, an analog-todigital converter included in the processing channel can convert the voltage levels associated with the image block into 8 bit digital values.

A determination is then made at block 602 as to whether one or more variable operating parameters used to capture the image block is set at a default value. In some embodiments, a variable operating parameter can be set at a preset value. The preset value can be modified based on a desired image characteristic or quality of the captured image block. For example, a variable gain and/or offset value can be modified to increase or decrease the contrast of an image block. Additionally or alternatively, one or more amplifiers may be fixed gain amplifiers and one or more offset circuits may have a fixed offset value. The operating parameters that have a fixed value and the operating parameters that are at a preset value may be known by a processing device and therefore not transmitted to the processing device. Only the operating parameters that are at non-default values may be transmitted to the processing device and used to reconstruct the voltage levels associated with an image block.

If the at least one operating parameter is not set at a fixed or default value, the process passes to block 604 where the image block and the variable operating parameters not set to a default value are transmitted to a processing device (e.g., secure processing device 522 in FIG. 5). Other embodiments can omit block 602 and transmit the default, fixed, and/or non-default values of the operating parameters to the processing device.

Next, as shown in block 606, the signal levels (e.g., voltage levels) of the respective capacitive sensing devices associated with the fingerprint pieces in the image block are reconstructed using the at least one operating parameter. By way of example only, an eight bit image block can be reconstructed into a 16 bit or 24 bit image block. The reconstructed image block can be stored in a storage device, such as in storage device 524 in FIG. 5.

A determination is then made at block 608 as to whether another image block is to be captured. If so, the method returns to block 600 and repeats until all of the image blocks have been captured and transmitted (along with the operating parameter(s)) to the processing device. When all of the image blocks have been captured at block 610, the process passes to block 610 where the reconstructed image blocks are combined to produce a reconstructed fingerprint image. The reconstructed fingerprint image can then be processed at block 612. By way of example only, a deblurring operation and/or a feature extraction operation can be performed on the reconstructed fingerprint image.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

Various embodiments have been described in detail with particular reference to certain features thereof, but it will be understood that variations and modifications can be effected within the spirit and scope of the disclosure. For example, a fingerprint sensing device can include a different type of sensing elements. Additionally or alternatively, a processing channel can include any number of variable gain amplifiers and/or variable offset circuits. Other types of biometric sensing devices can be used in other embodiments.

Even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

I claim:

1. A method for operating a biometric sensing device that includes a plurality of sensing elements, wherein the biometric sensing device is operatively connected to a processing channel that includes at least one variable gain amplifier and at least one variable offset circuit operatively connected to an input of an analog to digital converter, the method comprising:
    processing a section of a biometric image using a particular gain for each variable gain amplifier and a particular offset value for each variable offset circuit;
    converting the section of the biometric image to digital values;
    transmitting the digitized section of the biometric image and at least one particular gain and at least one particular offset value to a processing device;
    reconstructing voltage levels on respective sensing elements in the biometric sensing device that are associated with the digitized section of the biometric image based on the at least one particular gain and the at least one particular offset value; and
    combining the reconstructed voltage levels to produce a reconstructed section of the biometric image.

2. The method as in claim 1, further comprising:
prior to transmitting the at least one particular gain to the processing device, determining whether the at least one particular gain is at a default value;
prior to transmitting the at least one particular offset value to the processing device, determining whether the at least one particular offset value is at a default value;
transmitting the digitized section of the biometric image to the processing device;
transmitting each gain to the processing device only when the gain is at a non-default value; and
transmitting each offset value to the processing device only when the offset value is at a non-default value.

3. A method for operating a biometric sensing device that includes a plurality of sensing elements, wherein the biometric sensing device is operatively connected to a processing channel that includes at least one variable offset circuit and at least one variable gain amplifier operatively connected to an input of an analog to digital converter, the method comprising:
capturing a biometric image;
dividing the biometric image into sections;
processing each section of the biometric image using a particular gain for each variable gain amplifier and a particular offset value for each variable offset circuit;
for each section of the biometric image,
converting the section of the biometric image to digital values;
transmitting the digitized section of the biometric image and at least one particular offset value and at least one particular gain to a processing device; and
reconstructing voltage levels on respective sensing elements in the biometric sensing device that are associated with the digitized section of the biometric image based on the at least one particular offset value and the at least one particular gain; and
combining the reconstructed voltage levels associated with the sections to produce a reconstructed biometric image.

4. The method as in claim 3, further comprising:
prior to transmitting the at least one particular offset value to the processing device, determining whether the at least one particular offset value is at a default value;
prior to transmitting the at least one particular gain to the processing device, determining whether the at least one particular gain is at a default value;
transmitting each digitized section of the biometric image to the processing device;
transmitting each offset value to the processing device only when the offset value is at a non-default value; and
transmitting each gain to the processing device only when the gain is at a non-default value.

5. A system comprising:
a biometric sensing device comprising a plurality of sensing elements;
a processing channel operatively connected to the biometric sensing device, wherein the processing channel includes a variable gain amplifier and a variable offset circuit operatively connected to an input of an analog to digital converter; and
a processing device operatively connected to an output of the analog to digital converter and to the variable gain amplifier and the variable offset circuit, wherein the processing device receives a digitized section of a biometric image and a gain of the variable gain amplifier and an offset value of the variable offset circuit and reconstructs voltage levels on respective sensing elements in the biometric sensing device that are associated with the digitized section of the biometric image based on the gain and offset value and combines the reconstructed voltage levels to produce a reconstructed section of the biometric image.

6. The system as in claim 5, wherein the processing device comprises a secure processing device.

7. The system as in claim 5, wherein the plurality of sensing elements comprises a plurality of capacitive sensing elements.

8. The system as in claim 5, wherein the biometric sensing device comprises a fingerprint sensing device.

9. The system as in claim 3, wherein the fingerprint sensing device comprises a capacitive fingerprint sensing device.

10. A system comprising:
a biometric sensing device comprising a plurality of sensing elements;
a processing channel operatively connected to the biometric sensing device, wherein the processing channel includes a variable offset circuit and a variable gain amplifier operatively connected to an input of an analog to digital converter; and
a processing device operatively connected to an output of the analog to digital converter and to the variable offset circuit and the variable gain amplifier, wherein the processing device receives digitized sections of a biometric image and at least one offset value of the variable offset circuit and at least one gain of the variable gain amplifier and reconstructs voltage levels on respective sensing elements in the biometric sensing device that are associated with the digitized sections of the biometric image based on the at least one offset value and the at least one gain and combines the reconstructed voltage levels to produce a reconstructed biometric image.

11. The system as in claim 10, wherein the processing device comprises a secure processing device.

12. The system as in claim 10, wherein the plurality of sensing elements comprises a plurality of capacitive sensing elements.

13. The system as in claim 10, wherein the biometric sensing device comprises a fingerprint sensing device.

14. The system as in claim 13, wherein the fingerprint sensing device comprises a capacitive fingerprint sensing device.

* * * * *